United States Patent [19]
Vincent et al.

[11] Patent Number: 6,096,801
[45] Date of Patent: Aug. 1, 2000

[54] PIGMENT COMPOSITIONS

[75] Inventors: Mark John Vincent, Houston; Greig Chisholm, West Acres, both of United Kingdom

[73] Assignee: Ciba Specialty Chemicals Corporation, Tarrytown, N.Y.

[21] Appl. No.: 09/081,428

[22] Filed: May 19, 1998

[51] Int. Cl.⁷ .............................. C09D 5/00; C09D 11/00
[52] U.S. Cl. .............................................. 523/161; 523/160
[58] Field of Search ...................................... 523/161, 160

[56] References Cited

U.S. PATENT DOCUMENTS

| | | | |
|---|---|---|---|
| 5,098,475 | 3/1992 | Winnik et al. | 106/22 |
| 5,120,361 | 6/1992 | Winnik et al. | 106/22 |
| 5,254,159 | 10/1993 | Gundlach et al. | 106/22 |
| 5,256,193 | 10/1993 | Winnik et al. | 106/21 |
| 5,266,106 | 11/1993 | Winnik et al. | 106/22 K |
| 5,558,968 | 9/1996 | Russell et al. | 430/109 |
| 5,561,214 | 10/1996 | Yeske et al. | 528/363 |
| 5,596,027 | 1/1997 | Mead et al. | 523/161 |
| 5,610,268 | 3/1997 | Meijer et al. | 528/363 |

FOREIGN PATENT DOCUMENTS

| | | |
|---|---|---|
| 0684044 | 11/1995 | European Pat. Off. . |
| 9719987 | 6/1997 | WIPO . |

*Primary Examiner*—James J. Seidleck
*Assistant Examiner*—U. K. Rajguru
*Attorney, Agent, or Firm*—David E. Crichton

[57] ABSTRACT

The present invention provides a composition comprising a pigment and from 0.1 to 10% by weight, based on the weight of pigment, of at least one dendrimer.

8 Claims, No Drawings

PIGMENT COMPOSITIONS

The present invention relates to pigment compositions suitable for usia in oil inks and/or liquid inks and/or paints.

Important properties of pigments for use in inks and/or paints include colour strength, gloss, transparency, strike-through, and non-settling. We have now found I:hat one or more of these properties can be improved if the pigment is mixed with a dendrimer.

Accordingly the present invention provides a composition comprising a pigment and from 0.1 to 10% by weight based on the weight of pigment, of at least one dendrimer.

Dendrimers are known compounds. They are symmetrical star-branched polymers comprising an initiator core such as nitrogen, diamine or plyhydroxy with a number of arms, each arm being composed of repeating units, the number of repeating units being considered as the generation of the dendrimer. Dendrimers are described in numerous references such as U.S. Pat. No. 4558120, U.S. Pat. No. 4587329 and EP 0271180.

The arms of a dendrimer may be terminated with functional groups. The preferred dendrimers for use in the present invention are of the amide type or ester type and may have hydroxyl, carboxyl, ester or amine terminal groups. The core is preferably a diamine such as ethylene diamine, propylene diamine or pentaerythritol.

While dendrimers of any generation may be used, the lower generation dendrimers are preferred on the grounds of cost. Dendrimers of generation 0.5 to 3.5 are particulary suitable.

Dendrimers based on an amine core and which have amine terminal groups are of generation 1, 2, 3 etc. Those which have hydroxyl, carboxyl or ester terminal groups are of generation 0.5, 1.5, 2.5 etc. The numbering of the generations for the amide type dendrimers in the present specification is according to that described by R Esfand, A E Beezer, J C Mitchell and L J Twyman in Pharmaceutical Sciences, 1996, vol.2, pages 1–3. The numbering of the generations for the ester type dendrimers in the present specification is according to that described by Bo Pettersson in Pigment & Resin Technology 1996, vol. 25, pages 4–14.

Examples of suitable dendrimers include the following

DENDRIMER 1

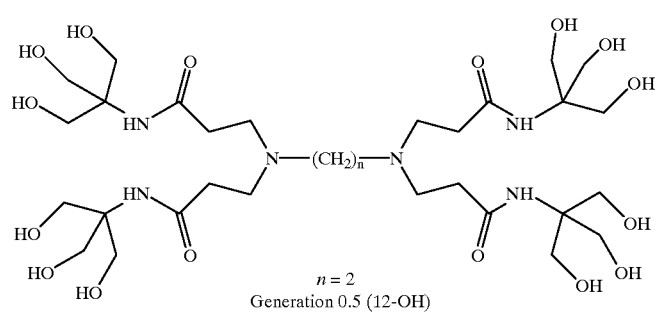

$n = 2$
Generation 0.5 (12-OH)

DENDRIMER 2

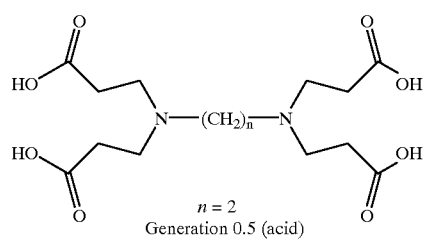

$n = 2$
Generation 0.5 (acid)

DENDRIMER 3

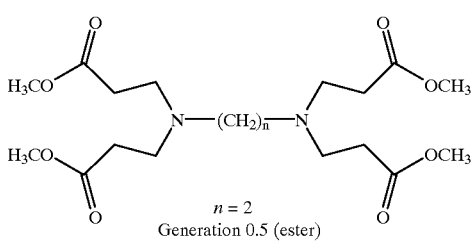

$n = 2$
Generation 0.5 (ester)

-continued
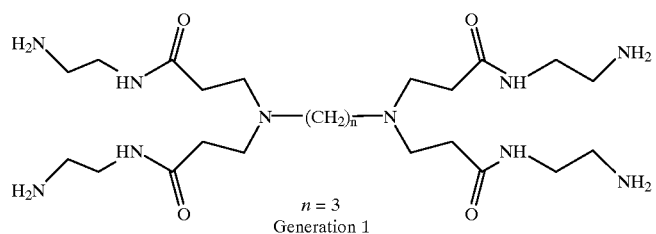
n = 3
Generation 1
DENDRIMER 4
DENDRIMER 5
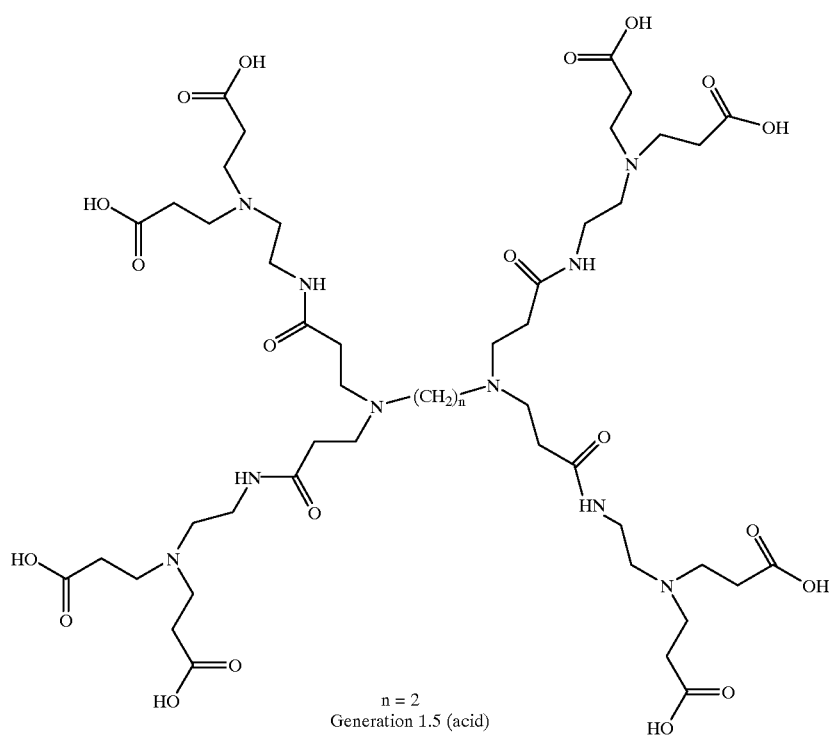
n = 2
Generation 1.5 (acid)
The two symbols X indicate that there are two more identical branched chains attached to the core ethylene diamine.

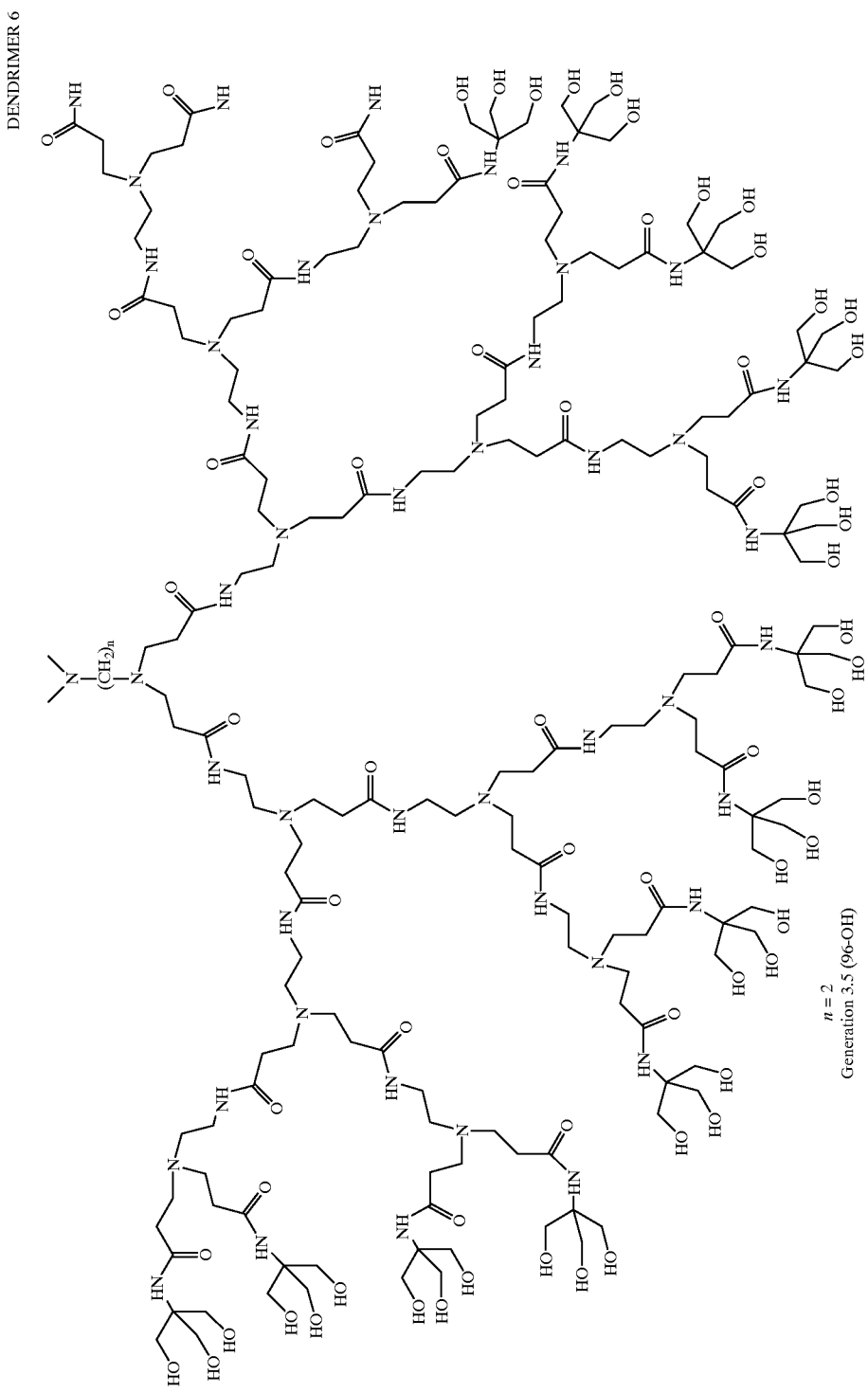

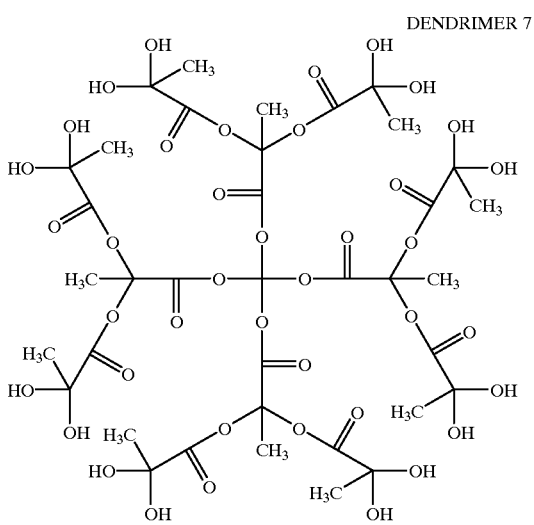

DENDRIMER 7

BOLTORN (RTM) 2 Generations with 16 hydroxyl groups

BOLTORN (RTM) 4 Generations with 64 hydroxyl groups

DENDRIMER 8

The pigment may be any organic pigment including azo, azomethine, phthalocyanine, anthraquinone, isoindoline, perinone, quinacridone, azo or azomethirie metal salts or complexes and diketopyrrolopyrrole pigments. Mixtures of pigments may also be used.

Preferred pigments are azo pigments, such as monoazo yellows, disazo yellows, monoazo reds, and disazo oranges, and phthalocyanines such as copper phthalocyanine. Specific preferred pigments include Pigment Orange 34, Pigment Yellow 13, Pigment Yellow 110, Pigment Yellow 111, Pigment Yellow 74, Pigment Blue 15:4, Pigment Red 57:1, Pigment Red 48:1, Pigment Red 48:2, Pigment Red 53:1 and Pigment Red 63:1.

The composition of the invention may contain other compounds commonly used with pigments, usually as surface treatments, such as, for example, resins, dyestuffs and/or surfactants.

Suitable resins include wood rosin, gum rosin, tall oil rosin, hydrogenated rosin, rosin esters, disproportionated rosin, dimerised rosin, polymerised rosin, phenolic resin, and carboxyl containing maleic or fumaric resin. The proportion of resin may vary over a wide range and may be for example 0.1 to 50% by weight based on the weight of pigment.

Suitable surfactants include anionic, cationic, amphoteric or non-ionic surfactants.

Anionic surfactants which may be used are, e.g. alkyl-, aryl- or aralkyl sulphates or sulphonates; alkyl-, aryl- or alkyl phosphates or -phosphonates; or carboxylic acids. Cationic surfactants which may be used are, e.g. primary-, secondary- or therapy amines, or quaternary salts of amines. Non-ionic surfactants which are suitable for use include long chain alcohols, alcohol- or amine/ethylene oxide condensates, amine oxides or phosphine oxides, and other castor oil derivatives. Amphoteric surfactants which may be used include alkyl betaines and imidazoline derivatives.

The amount of surfactant may vary over a wide range and may be, forexample, 0.1 to 20% by weight based on the weight of pigment.

When a dyestuff is present, it is usually a water soluble version of the pigment containing such water solubilising groups as carboxyl or sulphonic groups. The amount of dyestuff may be from 1 to 20% by weight based on the weight of pigment.

The dendrimer and any surface treatments used may be added before, during or after the pigment manufacture or to the dry pigment after its preparation .

By way of illustration, using azo pigments as an example, the following methods may be used to prepare the compositions of the invention:

1. Diazotised amine is added to an aqueous solution or suspension of coupling component and surface treatments. Once coupling is completed a dendrimer is added and the preparation completed by pH adjustment and heat treatment.
2. Diazotised amine is added to an aqueous solution or suspension of coupling component. Once coupling is completed appropriate surface treatments are added along with the dendrimer. The preparation is completed by pH adjustment and heat treatment.
3. Diazotised amine is added to an aqueous solution or suspension of coupling component, surface treatments and dendrimer. Once coupling is completed the preparation is finished by adjustment of the pH and heat treatment.
4. Diazotised amine is added to an aqueous solution or suspension of coupling component and dendrimer. Once coupling is completed appropriate surface treatments are added. The preparation is completed by adjustment of pH and heat treatment.
5. A mixture of dendrimer and diazotised amine is added to an aqueous solution or suspension of coupling component and surface treatments. The preparation is completed by pH adjustment and heat treatment.
6. A mixture of dendrimer and diazotised amine is added to an aqueous solution or suspension of coupling component. Once coupling is completed appropriate surface treatments are added. The preparation is completed by pH adjustment and heat treatment.
7. Dry pigment, dendrimer and surface treatments are mixed/milled in such a way as to obtain an intimate mixture.

The compositions of the invention are useful for colouring inks and paints.

The present invention also provides an ink or paint which contains as a colourant, a composition comprising a pigment and from 0.1 to 10% by weight, based on the weight of pigment, of at least one dendrimer.

The invention is illustrated by the following Examples, in which dendrimers 1 to 8 are those given above.

Dendrimer 1

Dendrimer 1 containing 12 surface hydroxyl groups is prepared according to R Esfand, A E Beezer, J C Mitchell and L J Twyman, Pharmaceutical Sciences 1996 Vol 2 Pages 1–3.

Dendrimer 2

Dendrimer 2 containing 4 surface carboxylate groups is obtained from Aldrich Chemical Company.

Dendrimer 3

Dendrimer 3 containing 4 surface carboxylic ester groups is prepared according to European Patent Application 0271 180 A1.

Dendrimer 4

Dendrimer 4 containing 4 surface primary amine groups is prepared according to European Patent Application 0271 180 A1.

Dendrimer 5

Dendrimer 5 containing 8 surface carboxylate groups is obtained from Aldrich Chemical Company.

Dendrimer 6

Dendrimer 6 containing 96 surface hydroxyl groups is prepared according to R Esfand, A E Beezer, J C Mitchell and L J Twyman Pharmaceutical Sciences 19963 Vol 2 Pages 1–3.

Dendrimer 7

Dendrimer 7 containing 16 surface hydroxyl groups is obtained Perstorp Polyols as BOLTORN (RTM) 2G Dendrimer 8

Dendrimer 8 containing 64 surface hydroxyl groups is obtained Perstorp Polyols as BOLTORN (RTM) 4G Preparation of Tetrazotised Dichlorobenzidine Dichlorobenzidine (38.6 g) is dispersed in water (150 ml). 36% Aqueous hydrochloric acid (53 ml) is added and the resulting slurry stirred for 5 minutes. The slurry is then cooled to 0° C. A solution of sodium nitrite (19.9 g) in water (40 ml) is added . The tetrazotised slurry obtained is stirred for 45 minutes while maintaining the temperature at 0° C. Activated charcoal (0.5 g) is added to the slurry, and the slurry is then filtered. The resulting tetrazotised diamirie is obtained as an aqueous solution.

EXAMPLE 1

To a dispersion of acetoacetmetaxylidide (62.5 g) in water (440 ml) is added 47% aqueous sodium hydroxide (27.5 g). The mixture is stirred until a complete solution is obtained. Glacial acetic acid (23.4 g) is added to water (80 ml) and the resultant mixture is added to the acetoacetmetaxylidide solution over 20 minutes. An aqueous suspension is obtained. The pH of this suspension is adjusted to 6 using dilute aqueous hydrochloric acid. The suspension is cooled to 16° C. The tetrazotised dichlorobenzidine is then added to the suspension over 70 minutes, allowing the pH to drop to 4.8 and then maintaining it at this value by addition of dilute sodium hydroxide solution. The temperature is maintained at 16° C. A pigment slurry is obtained. The dyestuff from tetrazotised benzidine disulfonic acid coupled to acetoacetmetaxylidide (1.9 g) is added to this slurry over 10 minutes and the resultant mixture is allowed to stir for 90 minutes at room temperature. The resultant pigment slurry is then split into four equal batches.

EXAMPLE 2

Using one of the batches of pigment slurry from Example 1, dendrimer 4 (1.25 g) is added and the slurry stirred for 15 minutes. The slurry is then heated to 95° C. over 30 minutes. The pH is adjusted to 4.5 and heating continued at 90–95° C. for a further 30 minutes. The slurry is cooled to 70° C., filtered and the presscake is washed with water and dried at 70° C. The resultant dried pigment is sieved through a 250 μm screen to give a powdered pigment composition.

EXAMPLE 3

The procedure of example 2 is repeated but adjusting the final pH to 4.0.

EXAMPLE 4

The procedure of example 2 is repeated but adjusting the final pH to 3.5.

EXAMPLE 5

The procedure of example 2 is repeated but adjusting the final pH to 3.0.

EXAMPLE 6

Dichlorobenzidine (19.5 g) is dispersed in water (75 ml). 36% Aqueous hydrochloric acid (27 ml) is added and the resulting slurry stirred for 5 minutes. The slurry is then cooled to 0° C. A solution of sodium nitrite (9.9g) in water (20 ml) is added . The tetrazotised slurry obtained is stirred for 45 minutes while maintaining the temperature at 0° C. Activated charcoal (0.5 g) is added to the slurry, and the slurry is then filtered. The resulting tetrazotised diamire is obtained as an aqueous solution.

To a dispersion of acetoacetmetaxylidide (31.3 g) in water (220 ml) is, added 47% aqueous sodium hydroxide (13.8 g). The mixture is stirred until a complete solution is obtained. Glacial acetic acid (11.7 g) is added to water (40 ml) and the resultant mixture is added to the acetoacetmetaxylidide solution over 20 minutes. An aqueous suspension is obtained. The pH of this suspension is adjusted to 6 using dilute aqueous hydrochloric acid. The suspension is cooled to 16° C. The tetrazotised dichlorobenzidine is then added to the suspension over 70 minutes, allowing the pH to drop to 4.8 and then maintaining it at this value by addition of dilute sodium hydroxide solution. The temperature is maintained at 16° C. A pigment slurry is obtained. Dendrimer4 (2.5 g) is added and the slurry stirred for 15 minutes. The slurry is then heated to 95° C. over 30 minutes. Heating is continued at 90–95° C. for a further 30 minutes. The slurry is cooled to 70° C., filtered and the presscake is washed with water and dried at 70° C. The resultant dried pigment is sieved through a 250 μm screen to give a powdered pigment composition.

EXAMPLE 7

Dichlorobenzidine (9.8 g) is dispersed in water (50 ml). 36% Aqueous hydrochloric acid (14 ml) is added and the resulting slurry stirred for 5 minutes. The slurry is then cooled to 0° C. A solution of sodium nitrite (5.0 g) in water (20 ml) is added . The tetrazotised slurry obtained is stirred for 45 minutes while maintaining the temperature at 0 ° C. Activated charcoal (0.5 g) is added to the slurry, and the slurry is then filtered. The resulting tetrazotised diamine is obtained as an aqueous solution.

To a dispersion of acetoacetanilide (13.5 g) in water (110 ml) is added 47% aqueous sodium hydroxide (6.9 g). The mixture is stirred until a complete solution is obtained. Glacial acetic acid (5.9 g) i's added to water (20 ml) and the resultant mixture is added to the acetoacetanilide solution over 20 minutes. An aqueous suspension is obtained. This suspension is stirred for 45 minutes. The pH of this suspension is adjusted to 6 using dilute aqueous hydrochloric acid. The suspension is cooled to 16° C. The tetrazotised dichlorobenzidine is then added to the suspension over 85 minutes, allowing the pH to drop to 4.8 and then maintaining it at this value by addition of dilute sodium hydroxide solution. The temperature is maintained at 16° C. throughout the addition of the tetrazotised dichlorobenzidine. A pigment slurry is obtained. Dendrimer 1 (1.25 g) is added and the slurry stirred for 30 minutes. The slurry is then heated to 95° C. over 20 minutes. Heating is continued at 90–95° C for a further 30 minutes. The slurry is cooled to 70° C., filtered and the presscake is washed with water and dried at 70° C. The resultant dried pigment is sieved through a 250 μm screen to give a powdered pigment composition.

EXAMPLE 8

Dichlorobenzidine (9.8 g) is dispersed in water (50 ml). 36% Aqueous hydrochloric acid (14 ml) is added and the resulting slurry stirred for 5 minutes. The slurry is then cooled to 0° C. A solution of sodium nitrite (5.0 g) in water (20 ml) is added. The tetrazotised slurry obtained is stirred 45 minutes while maintaining the temperature at 0° C. Activated charcoal (0.5 g) is added to the slurry, and the slurry is then filtered. The resulting tetrazotised diamine is obtained as an aqueous solution.

To a dispersion of acetoacetmetaxylidide (15.6 g) in water (110 ml) is added 47% aqueous sodium hydroxide (6.9 g). The mixture is stirred until a complete solution is obtained. Glacial acetic acid (5.9 g) is added to water (20 ml) and the resultant mixture is added to the acetoacetmetaxylidide solution over 20 minutes. An aqueous suspension is obtained. This suspension is stirred for 45 minutes and is then cooled to 16 ° C. The tetrazotised dichlorobenzidine is then added to the suspension over 70 minutes, allowing the pH to drop to 4.8 and then maintaining it at this value by addition of dilute sodium hydroxide solution. The temperature is maintained at 16° C.A pigment slurry is obtained. Dendrimer 1 (1.25 g) is added and the slurry stirred for 30 minutes. The slurry is then heated to 95 ° C. over 20 minutes. Heating is continued at 90–95° C. for a further 30 minutes. The slurry is cooled to 70° C., filtered and the presscake is washed with water and dried at 70 ° C. The resultant dried pigment is sieved through a 250 μscreen to give a powdered pigment composition.

EXAMPLE 9–18

Printing inks are prepared by dispering the pigment compositions obtained in Examples 2–8 in a sheetfed carnish ink using a Muller. A control ink is prepared by similarly dispersing in the same vehicle a control pigment composition prepared by the procedure of the appropriate example but omitting the addition of the dendrimer. The resulting inks are printed on sheets of Paladin card and visually assessed for colour strength and transparency. The results are given below, expressed as percentages taking the colour strength of the control ink as 100%, higher values denoting higher colur strength. Results for transparency are expressed as known in the art.

| Example | Pigment Composition | Strength (visual) |
|---|---|---|
| 9 | Example 2 | 105 |
| 10 | Example 3 | 115 |
| 11 | Example 5 | 105 |

| Example | Pigment Composition | Transparency |
|---|---|---|
| 12 | Example 2 | 1TR |
| 13 | Example 3 | 2TR |
| 14 | Example 4 | 2TR |
| 15 | Example 5 | 1TR |
| 16 | Example 6 | 1TR |
| 17 | Example 7 | 1TR |
| 18 | Example 8 | 1TR |

EXAMPLE 19

Dichlorobenzidine (16.9 g) is dispersed in water(75 ml). 36% Aqueous hydrochloric acid (23 ml) is added and the resulting slurry stirred for 5 minutes. The slurry is then cooled to 0° C. A solution of sodium nitrite (8.7 g) in water (20 ml) is added. The tetrazotised slurry obtained is stirred for 45 minutes, while maintaining the temperature at 0° C. Activated charcoal (0.5 g) is added to the slurry, and the slurry is then filtered. The resulting tetrazotised diamine is obtained as an aqueous solution.

To a dispersion of acetoacetmetaxylidide (27.3 g) in water (250 ml) is added 47% aqueous sodium hydroxide (11.9 g). The mixture is stirred until a complete solution is obtained. Glacial acetic acid (9.4 g) and 36% aqueous hydrochloric acid (2.4 g) are added to water (60 ml) and the resultant mixture is added to the acetoacetmetaxylidide solution over 26 minutes. An aqueous suspension is obtained. The volume of this suspension is adjusted tD 1000 ml with water. This suspension is cooled to 10–12° C. and the pH is adjusted to 4.6 by addition of dilute hydrochloric acid solution. The tetrazotised dichlorobenzidine is then added to the suspension over 116 minutes. During this time the pH was maintained in the range 4.5–4.6 by addition of dilute sodium hydroxide solution and the temperature was maintained at 10–12° C. A pigment slurry is obtained. The slurry is stirred for 15 minutes and the pH was raised to 10.5 using dilute sodium hydroxide solution. To the slurry were then added a solution of Burez 505A-a clisproportionated tall oil rosin-(10.2 g) and laurex 4526-a straight chain primary fatty alcohol available from Albright & Wilson-(2.5 g) in water over 10 minutes. The pH of the slurry is adjusted to 10.5. The slurry is heated to 93° C. over 11 minutes and the pH adjusted to 5.5 using dilute aqueous hydrochloric acid solution. Dendrimer 1 (0.5 g) is added and the slurry is heated at 90–95° C. for a further 30 minutes. The slurry is cooled to 70 OC and filtered and the presscake is washed with water and dried at 70° C. The resultant dried pigment is sieved through a 250 μm screen to give a powdered pigment composition.

EXAMPLE 20

A printing ink is prepared by dispersing the pigment composition obtained in Example 19 in a heatset varnish ink vehicle using a hand premix, followed by a triple roll mill. A control ink is prepared by the same procedure as given in Example 19 omitting the addition of the dendrimer. The resulting inks are printed on Apco II II paper and transparency is visually assessed. Results are expressed as known in the art.

| Example | Pigment Composition | Transparency |
|---|---|---|
| 20 | Example 19 | 1TR |

EXAMPLE 21

Dichlorobenzidine (20.6 g) is dispersed in water (75 ml). 36% Aquecus hydrochloric acid (28 ml) is added and the resulting slurry stirred for 5 minutes. The slurry is then cooled to 0° C. A solution of sodium nitrite (10.6 g) in water (15 ml) is added. The tetrazotised slurry obtained is stirred for 45 minutes, while maintaining the temperature at 0° C. Activated charcoal (0.5 g) is added to the slurry, and the slurry is then filtered. The resulting tetrazotised diamine is obtained as an aqueous solution.

To a dispersion of 1-tolyl-3-methylpyrazol-5-one (30.3 g) and 1-pheriyl-3-methylpyrazol-5-one (0.2 g) in water (250 ml) is added 47% aqueous sodium hydroxide solution (14.8 g). The mixture is stirred until a complete solution is obtained. The volume is adjusted to 300 ml with water. In a separate flask, sodium acetate (1.6 g) is dissolved in water (200 ml). The volume is adjusted to 350 ml with water and the pH is lowered to 4.0 with dilute aqueous acetic acid solution. The solution containing the 1-tolyl-3-methylpyrazol-5-one and 1-phenyl-3-methylpyrazol-5-one is added to the sodium acetate solution until the pH rises to 5.8. Dendrimer 1 (2.5 g) is then added. This mixture is then heated to 29° C. and the tetrazotised dichlorobenzidine solution is added until the pH falls to 4.5. The tetrazotised dichlorobenzidine solution is then added simultaneously with the 1-tolyl-3-methylpyrazol-5-one/1-phenyl-3-methylpyrazol-5-one solution to the sodium acetate solution. The temperature of the sodium acetate solution is maintained at 30° C. and the pH is maintained in the range 4.5–4.8 by addition of dilute aqueous sodium hydroxide solution if necessary. The additions take place over 45 minutes. A pigment slurry is obtained. This slurry is stirred for 1 hour and heated to boiling. The slurry is boiled for 10 minutes before being cooled to 70° C. and filtered. The presscake is washed with water and dried alt 70° C. The resultant dried pigment is sieved through a 250 μm screen to give a powdered pigment composition.

EXAMPLE 22

To a dispersion of 2,5-dichloroaniline (20.4 g) in water (140 ml) at 60° C. is added 36% aqueous hydrochloric acid (37.4 g) over 15 minutes. The mixture is heated al: 60° C. until a complete solution is obtained. The solution is cooled to 0° C. by the addition of ice. A solution of sodium nitrite (8.7 g) in water (50 ml) is added. The diazotised slurry obtained is stirred for 90 minutes, while the temperature is maintained at 0° C. Activated charcoal (0.3 g), celite (0.3 g) and ethylene diaminetetraacetic acid (0.3 g) is added and the mixture is stirred for 10 minutes and filtered. The resulting diazotised amine is obtained as an aqueous solution. The volume of this solution is adjusted to 620 ml using water. The temperature is maintained at 0° C. To a dispersion of 3-hydroxy-2-naphthanilide (34.9 g) in water (320 ml) is added 47% aqueous sodium hydroxide solution (16.5 g). The mixture is heated at 80° C. and stirred until a complete solution is obtained. The volume of this solution is adjusted to 520 inl using water and the temperature is lowered to 50° C.

In a separate flask sodium formate in (3.0 g) in water (820 ml) is cooled to 15–20° C. and the pH is adjusted to 5.0 using dilute aqueous acetic acid solution. The 3-hydroxy-2-naphthanilide solution is added to this flask until the pH reaches 7. The diazotised amine solution is then added simultaneously with the 3-hydroxy-2-naphthanilide solution, such that the pH is allowed to rise to 8.5–9.0 and then is maintained in this range by adjustment of the relative rates of addition of the solutions. The temperature is maintained at 15–20° C. A pigment slurry is obtained. The pH of this slurry is raised to 12 by addition of dilute aqueous sodium hydroxide solution. Dendrimer 1 is added and the mixture is stirred for 15 minutes. The slurry is then heated to 80° C. The heated slurry is filtered and the presscake obtained is washed with hot water and dried at 60° C. The resulting dried pigment is sieved through a 250 μm screen to give a powdered pigment composition.

EXAMPLE 23

To a dispersion of 2-methoxy4-nitroaniline (19.7 g) in water (100 ml) is added 36% aqueous hydrochloric acid solution (22 ml). The mixture is stirred until a complete solution is obtained. The solution is cooled to 0° C. by addition of ice. A solution of sodium nitrite (8.8 g) in water (50 ml) is added. The diazotised slurry obtained is stirred for 1 hour while the temperature is maintained at 0° C.

2-Methoxy-5-chloroacetoacetylanilide (28.1 g) is dissolved in water (100 ml) and 47% aqueous sodium hydroxide solution (10 ml). The temperature of this solution is adjusted to 0° C. by the addition of ice. The volume of this solution is adjusted to 230 ml. To this solution is added a solution of Cirrasol ALN-WF-a non-ionic surfactant available from I.C.I.-(2.5 g) and sodium acetate (5.1 g) in water over 10 minutes. The pH of the solution is adjusted to 6.5 using dilute aqueous acetic acid solution. The diazotised amine solution is then added to the solution over 60 minutes ensuring the temperature remains below 15° C. When all available 2-methoxy-5-chloroacetoacetylaniline has reacted a solution of 2-methoxy-5-chloroacetoacetylanilide (2.5 g) in water (50 ml) and 47% aqueous sodium hydroxide solution (2 ml) is added and addition of the diazotised amine is continued until coupling is complete. A pigment slurry is obtained. Dendrimer 1 is added and the mixture stirred for 10 minutes. The slurry is then heated to 70° C. over 50 minutes. The heated slurry is filtered and the presscake obtained is washed with hot water and dried at 60 IC. The resulting dried pigment is sieved through a 250 μm screen to give a powdered pigment composition.

EXAMPLE 24–26

Printing inks are prepared by dispersing the pigment compositions obtained in Examples 21–23 in an alcohol/nitrocellulose liquid ink vehicle using a ballmill. A control ink is made by similarly dispersing in the same vehicle a control pigment composition prepared by the procedure of the appropriate example but omitting the dendrimer. The resulting inks are printed on wolvercoate paper, and MXXB/A and MXXT/S cellophane and assessed for color strength using a Gretag D196 densitometer and gloss using a Erichson mini gloss meter. Transparency is visually assessed. The results are given below expressed as percentages for gloss and colour strength taking the gloss and colour strength of the control ink as 100%. Results for transparency are expressed as known in the art.

| Example | Pigment Composition | Colour Strength | Gloss | Transparency |
| --- | --- | --- | --- | --- |
| 24 | Example 21 | 107 | 144 | 2TR |
| 25 | Example 22 | 105 | — | — |
| 26 | Example 23 | — | 105 | 2TR |

EXAMPLE 27

Dichlorobenzidine (18.8 g) is dispersed in water(75 ml). 36% Aqueous hydrochloric acid (26 ml) is added and the resulting slurry stirred for 5 minutes. The slurry is then cooled to 0° C. A solution of sodium nitrite (10.3 g) in water (25 ml) is added . The tetrazotised slurry obtained is stirred for 45 minutes while maintaining the temperature at 0° C. Activated charcoal (0.5 g) is added to the slurry, and the slurry is then filtered. The resulting tetrazotised diamine is obtained as an aqueous solution.

To a dispersion of acetoacetmetaxylidide (30.4 g) in water (200 ml) is added 47% aqueous sodium hydroxide (12.5 g). The mixture is stirred until a complete solution is obtained. Glacial acetic acid (4.6 g) is added to water (30 ml) and the resultant mixture is added to the acetoacetmetaxylidide solution over 15 minutes. An aqueous suspension is obtained. This suspension is cooled to 12° C. and the pH is adjusted to 6.0 by addition of dilute hydrochloric acid solution. The tetrazotised dichlorobenzidine is then added to the suspension over 100 minutes. During this time the pH is maintained in the range 6.0–6.2 by addition of dilute sodium hydroxide solution and the temperature is maintained at 12° C. A pigment slurry is obtained. Belloid FR-a triethanolamine soap-(2.1 g) is dissolved in water (15 ml) and added to the pigment slurry over 5 minutes. Dendrimer 1(2.5 g) is added. The slurry is then heated to 93° C. and held at this temperature for 1 hour. The pH is lowered to 5.5 by addition of dilute aqueous hydrochloric acid solution. The slurry is cooled to 70° C., filtered, washed with water and dried at 70 ° C. The resultant dried pigment is sieved through a 250 μm screen to give a powdered pigment composition.

EXAMPLE 28

A printing ink is prepared by dispersing the pigment composition obtained in Example 27 in an aqueous liquid ink vehicle using a ballmill. A control is made by similarly dispersing in the same vehicle a control pigment composition prepared by the procedure of the appropriate example but omitting the dendrimer. The resulting inks are printed on brown craft paper and visually assessed for transparency. The results are given below.

| Example | Pigment Composition | Transparency |
|---------|---------------------|--------------|
| 28      | Example 27          | 2TR          |

EXAMPLE 29

To a dispersion of 2-methoxy4-nitroaniline (22.1 g) in water (30 ml) is added 36% aqueous hydrochloric acid solution (24.8 g). The mixture is stirred until a complete solution is obtained. The solution is cooled to 0° C. by the addition of ice. A solution of sodium nitrite (9.3 9) in water (50 ml) is added. The diazotised slurry obtained is stirred for 60 minutes while the temperature is maintained at 0° C. Activated charcoal (0.3 g), celite (0.3 g) and ethylenediamine tetraacetic acid (0.3 9) are added, and the mixture is filtered. The resulting diazotised amine is obtained as an aqueous solution. The volume of this solution is adjusted to 210 ml using water. The temperature is maintained at 0° C.

Acetoacet-2-anisidine (28.6 g) is dissolved in water (105 ml) and 47% aqueous sodium hydroxide solution (8.0 9). The volume of this solution is adjusted to 240 ml with water. Glacial acetic acid (10.4 g) is added to water (50 ml) and the resultant mixture is added to the acetoacet-2-anisidine solution over 10 minutes. An aqueous suspension is obtained. Calcium carbonate (5.2 g) and dendrimer 1 (2.5 g) are added to the suspension and the mixture stirred for 10 minutes. The pH is adjusted to 6.2 using dilute hydrochloric acid solution, and the temperature is lowered to 15° C.by the addition of ice. The diazo solution is added to the aqueous suspension over 95 minutes maintaining the temperature at 15° C. A pigment slurry is obtained. The slurry is heated to boiling and maintained in this condition for 1 hour. The temperature is then lowered to 70° C. and the pH adjusted to 5.2 by addition of dilute hydrochloric acid. The slurry is filtered, washed with water and dried at 70° C. The resultant dried pigment is sieved through a 250 μm screen to give a powdered pigment composition.

EXAMPLE 30

An air-drying decorative paint is prepared by dispersing the pigment composition obtained in Example 29 in a solvent based paint vehicle using a dispermat. A control paint is made by similarly dispersing in the same vehicle a control pigment composition prepared by the procedure of example 30 but omitting the dendrimer. The resulting paint is painted on Astrolux card, and assessed for colour strength using an X-rite SP68T spectrophotometer. The results for colour strength are given below and are expressed as percentages taking the colour strength of the control ink as 100%.

| Example | Pigment Composition | Strength |
|---------|---------------------|----------|
| 30      | Example 29          | 122      |

EXAMPLE 31

To a dispersion of 2-amino-5-methylbenzene sulphonic acid (18.7 g) in water (150 ml) is added 47% aqueous sodium hydroxide solution (8.7 g). The mixture is heated at 39° C. and stirred until a complete solution is obtained. This solution is cooled to 0° C. by the addition of ice. A solution of sodium nitrite (6.9 g) in water (25 ml) is added followed by 36% aqueous hydrochloric acid (19 ml). The diazotised slurry obtained is stirred for 20 minutes while the temperature is maintained at 0° C.

2-hydroxy-3-naphthoic acid (18.8 g) is dissolved in water (120 ml) and 47% aqueous sodium hydroxide (19.0 g) at 40° C. To the solution are added CI Food Orange 2 (2.2 g), a solution of Beviros 95 (A Tall Oil Rosin available from Bergvik Kemi AB) (4.4 g) in water (80ml) and 47% aqueous sodium hydroxide (1.2 g), and Empicol LX (sodium salt of lauryl sulphate available from Albright and Wilson) (2.2 g) at 70° C. The solution obtained is cooled to 10° C. and dendrimer 1 (2.2 g) is added. The diazotised slurry is then added, with stirring, over 30 minutes. Solid calcium chloride (30.9 g) is added to the suspension obtained and stirring is continued for 60 minutes, while maintaining a temperature of 8–10° C.. The slurry is then heated to 50° C. over 50 minutes and held at this temperature for 10 minutes. The pH of the resulting slurry is adjusted to 7.3 by the addition of dilute hydrochloric acid. The heated slurry is filtered and the presscake obtained is washed with water, granulated, dried at 70° C. and roasted at 90° C. The resulting granules are sieved through a 250 μm screen to give a powdered pigment composition.

EXAMPLE 32

The procedure of Example 31 is repeated, but replacing the dendrimer 1 by dendrimer 2.

EXAMPLE 33

The procedure of Example 31 is repeated, but replacing the dendrimer 1 by dendrimer 3.

EXAMPLE 34

The procedure of Example 31 is repeated, but replacing the dendrimer 1 by dendrimer 4.

EXAMPLE 35

The procedure of Example 31 is repeated but replacing the dendrinier 1 by dendrimer 5.

EXAMPLE 36

The procedure of Example 31 is repeated but replacing the dendrinier 1 by dendrimer 6 (0.5 g).

EXAMPLE 37–44

Printing inks are prepared by dispersing the pigment composition obtained in Examples 32–37 in a Toluene Zinc/Calcium Resinate Gravure Ink Vehicle, using a Beadmill. A control ink is prepared by similarly dispersing in the same vehicle a control pigment composition prepared by the procedure of Example 31, but omitting dendrimer 1. The resulting inks are printed on sheets of APCO, coated and uncoated paper and the strength and gloss calculated using a GRETAG D196 densitometer and Erichsen Mini Gloss Meter respectively. The settling in the final ink was assessed visually.

The results are given in the table, expressed as percentages taking the colour strength and gloss of the control ink as 100%, higher values denoting higher colour strength and gloss.

| Example | Pigment Composition | Paper | Colour Strength | Gloss |
|---------|---------------------|-------|-----------------|-------|
| Control | Control | APCO | 100 | 100 |
|  |  | Coated | 100 | 100 |
|  |  | Uncoated | 100 | 100 |
| 37 | Example 31 | APCO | 118 | 118 |
|  |  | Coated | 116 |  |
|  |  | Uncoated | 109 |  |
| 38 | Example 32 | APCO | 112 | 105 |
|  |  | Coated | 113 |  |
|  |  | Uncoated | 106 |  |
| 39 | Example 33 | APCO | 110 | 105 |
|  |  | Coated | 117 |  |
|  |  | Uncoated | 119 |  |
| 40 | Example 34 | APCO | 100 | 105 |
|  |  | Coated | 93 |  |
|  |  | Uncoated | 107 |  |
| 41 | Example 35 | APCO | 109 | 104 |
|  |  | Coated | 115 |  |
|  |  | Uncoated | 113 |  |
| 42 | Example 36 | APCO | 101 | 100 |
|  |  | Coated | 97 |  |
|  |  | Uncoated | 113 |  |

| Example | Pigment Composition | Final Ink Settling |
|---------|---------------------|--------------------|
| Control | Control | Moderate–Severe |
| 43 | Example 31 | Slight–Moderate |
| 44 | Example 36 | Slight |

These results show that in all cases there is an improvement in gloss and/or settling and that in nearly every case there is also an improvement in colour strength—even using the composition of Example 36 which contains a very small amount of dendrimer.

EXAMPLE 45

A mixture of crude copper phthalocyanine, (75 g), dimethyl aminomethyl copper phthalocyanine (5.3 g) and dendrimer 1 (4.0 g) is milled using 0.5 inch steel balls (2315g) and ¾ inch tacks (530 g) on a vibratom mill, for 214 minutes to give a blue powdered pigment composition.

EXAMPLE 46

A printing ink is prepared by dispersing the pigment composition obtained in Example 45 in a toluene phenolic gravure ink vehicle, using a beadmill. A control ink is prepared by similarly dispersing in the same vehicle a control pigment composition prepared by the procedure of Example 45, but omitting dendrimer 1. The resulting inks are printed on sheets of light weight uncoated paper (38 g/m$^2$) and visually assessed for strikethrough. The ink prepared using the pigment composition from Example 45 has superior strike through.

EXAMPLE 47

The isoindoline pigment IRGAZIN yellow 2LRT (50 g) is dispersed in water (450 ml) and methanol (50 ml). The mixture is stirred for 85 minutes. Dendrimer 1 (2.5 g) is added and stirring is continued for a further 3 hours. The pigment slurry is filtered, and the presscake washed with water. The presscake is allowed to air dry for 18 hours before drying in an oven at 70° C. for 7 hours. The resultant dried pigment is sieved through a 250 μm screen to give a powdered pigment composition.

EXAMPLE 48

An ink was prepared by dispersing the pigment composition from Example 47 in a vinyl ink system via an Eiger miniaturised beadmill. A control ink is made by similarly dispersing in the same vehicle a control pigment composition prepared by the procedure of Example 47 but omitting the dendrimer. Illustrations are produced on vinyl wallcovering and Morest chart using K-Bar No.2 and these are visually assessed for colour strength.

The result for colour strength is expressed as a percentage taking the colour strength of the control ink as 100%, and is 105%.

EXAMPLE 49

To a dispersion of 2-amino-5-methylbenzene sulphonic acid (19.8 g) and 2-amino-1-naphthalene sulphonic acid (0.8 g) in water (148 ml) is added 47% aqueous sodium hydroxide solution (9.6 g). The mixture is heated at 39° C. and stirred until a complete solution is obtained. This solution is cooled to 0° C. by the addition of ice. A solution of sodium nitrite (7.39 g) in water (25 ml) is added followed by 36% aqueous hydrochloric acid (23 ml). The diazotised slurry is stirred for 20 minutes while the temperature is maintained at 0° C.

Beviros 95 Rosin (9.1 g) is dissolved in water (147 ml) and 47% aqueous sodium hydroxide (3.1 g) at 70° C. To the solution are added water (147 ml), 47% aqueous sodium hydroxide (21 g) and 2-hydroxy-3-naphthoic acid (21 g). When solution is complete the solution is cooled to 6° C. and dendrimer I (4.8 g) is added. The solution is added simultaneously with the diazotised slurry to water (300 ml) over 60 minutes, while maintaining the temperature at 6–10° C. and pH at 11.0. Solid calcium chloride (1 8.0 g) is added to the suspension obtained and stirring is continued for 90 minutes, while maintaining the temperature at 8–10° C. The pH of the slurry is adjusted to 5.0 by the addition of dilute hydrochloric acid. The slurry is heated to 70° C. and strontium nitrate (7.5 g) added. The slurry is held at 70° C. for 30 minutes and then a solution of alumina sulphate (3.0 g) in water (38 ml) is added whilst maintaining the pH at 5.0. The slurry is held at 70° C. for a further 30 minutes and then filtered and the resulting presscake washed salt free with water, granulated, and dried at 70° C. and roasted at 90° C. The resulting granules are sieved through a 250 μm screen to give a powdered pigment composition.

EXAMPLE 50

Printing inks are prepared by dispersing the pigment composition obtained in Example 49 in an aqueous acrylic varnish system using a beadmill. A control ink is prepared by similarly dispersing in the same vehicle a control pigment composition prepared by the procedure of Example 49, but omitting dendrimer 1. The resulting inks are printed on Bladonart coated paper and the strength and gloss calculated using a Gretag D196 densitometer and Erichsen Mini Gloss Meter respectively.

The results are given in the table, expressed as percentages taking the colour strength and gloss of the control ink as 100%, higher values denoting higher colour strength and gloss.

| Example | Pigment Composition | Colour Strength | Gloss |
|---------|---------------------|-----------------|-------|
| Control | Control             | 100             | 100   |
| 50      | 49                  | 110             | 105   |

EXAMPLE 51

To a dispersion of 2-amino-5-methylbenzene sulphonic acid (19.8 g) and 2-amino-1-naphthalene sulphonic acid (0.8 g) in water (148ml) is added 47% aqueous sodium hydroxide solution (9.6 g). The mixture is heated at 39° C. and stirred until a complete solution is obtained. This solution is cooled to 0° C. by the addition of ice. A solution of sodium nitrite (7.1 g) in water (25 ml) is added followed by 36% aqueous hydrochloric acid (23 ml). The diazotised slurry is stirred for 20 minutes while the temperature is maintained at 0° C.

Beviros 95 Rosin (9.1 g) is dissolved in water (147 ml) and 47% aqueous sodium hydroxide (3.1 g) at 70° C. To the solution are added water (147 ml), 47% aqueous sodium hydroxide (21 g) and 2-hydroxy-3-naphthoic acid (21 g). When solution is complete the solution is cooled to 6° C. The solution is added simultaneously with the diazotised slurry to a solution of dendrimer 1 (2.4 g) in water (300 ml) over 60 minutes, while maintaining the temperature at 6–10° C. and pH at 11.0. Solid calcium chloride (18.0 g) is added to the suspension obtained and stirring is continued for 90 minutes, while maintaining the temperature at 8–10° C. The pH of the slurry is adjusted to 5.0 by the addition of dilute hydrochloric acid. The slurry is heated at 70° C. and held at 70° C. for 30 minutes. The slurry is then filtered and the resulting presscake washed salt free with water, granulated, and dried at 70° C. and roasted at 90° C. The resulting granules are sieved through a 2501 μm screen to give a powdered pigment composition.

EXAMPLE 52

The procedure of Example 31 is repeated but replacing the dendrimer 1 with dendrimer 7.

EXAMPLE 53

The procedure of Example 31 is repeated but replacing the dendrimer 1 by dendrimer 8.

EXAMPLE 54–55

The procedure of examples 37–44 is repeated but using the pigment compositions of examples 52 and 53 instead of examples of 32–36. A control ink is prepared by similarly dispersing in the same vehicle a control pigment composition prepared by the procedure of Example 31, but omitting dendrimer 1.

The results are given in the table expressed as percentages taking the colour strength and gloss of the control ink as 100%, higher values denoting higher colour strength and gloss.

Results:

| Example | Pigment Composition | Paper    | Colour Strength | Gloss |
|---------|---------------------|----------|-----------------|-------|
| Control | Control             | APCO     | 100             | 100   |
|         |                     | Coated   | 100             |       |
|         |                     | Uncoated | 100             |       |
| Example 54 | Example 52       | APCO     | 112             | 116   |
|         |                     | Coated   | 120             |       |
|         |                     | Uncoated | 112             |       |
| Example 55 | Example 53       | APCO     | 104             | 114   |
|         |                     | Coated   | 110             |       |
|         |                     | Uncoated | 104             |       |

EXAMPLE 56

Dichlorobenzidine (17.7 g) is dispersed in water (75 ml). 36% aqueous hydrochloric acid (25 ml) is added and the resulting slurry stirred for 5 minutes. The slurry is then cooled to 0° C. A solution of sodium nitrite (9.0 g) in water (20 ml) is added . The tetrazotised slurry obtained is stirred for 45 minutes, while maintaining the temperature at 0° C. Activated charcoal (0.5 g) is added to the slurry, and the slurry is then filtered. The resulting tetrazotised diamine is obtained as an aqueous solution.

To a dispersion of acetoacetmetaxylidide (28.9 g) in water (180 ml) is added 47% aqueous sodium hydroxide (12.7 g). The mixture is stirred until a complete solution is obtained. Glacial acetic acid (9.98 g) and 36% aqueous hydrochloric acid solution (2.75 g) is added to water (70 ml) and the resultant mixture is added to the acetoacetmetaxylidide solution over 20 minutes. An aqueous suspension is obtained. Dendrimer 7 (5.3 g) is dissolved in water (150 ml) and is added to this suspension. The pH of this suspension is adjusted to 4.6 using dilute aqueous hydrochloric acid. The suspension is cooled to 10 ° C. The tetrazotised dichlorobenzidine is then added to the slurry over 71 minutes, maintaining the pH in the range 4.6–4.8 by addition of dilute aqueous sodium hydroxide solution. The temperature is maintained at 10° C. A pigment slurry is obtained. This slurry is stirred for 5 minutes before the pH is adjusted to 10.6 using dilute aqueous sodium hydroxide solution. The slurry is heated to 90° C. whereupon by Laurex 4526 (2.7 g) (a straight chain primary fatty alcohol available from Albright & Wilson) in water (100 ml) is added, followed by Burez 505A (10.8 g) (a disproportionated tall oil rosin manufactured by Eka Nobel). The slurry is further heated to 95° C. and maintained at this temperature for 15 minutes. The pH is adjusted to 5.5 using dilute aqueous hydrochloric acid solution. The slurry is cooled to 70° C., filtered and the presscake is washed with water and dried at 70° C. The resultant: dried pigment is sieved through a 250 μm screen to give a powdered pigment composition.

EXAMPLE 57

Procedure of example 56 is repeated but replacing dendrimer 7 with 2.6 g of dendrimer 8.

EXAMPLE 58–59

A printing ink is prepared by dispersing the pigment composition obtained in examples 56–57 in a heatset varnish ink vehicle using a hand premix, followed by a triple roll mill. A control ink is prepared by the same procedure as given in example 56 omitting the addition of the dendrimer. The resulting inks are printed and assessed for colour strength using a a Gretag D196 densitometer and gloss using a Erichson mini gloss meter. Results are expressed as a percentage of the control ink with higher values indicating superior performance. Transparency is visually assessed. Results are expressed as known in the art.

| Example    | Colour Strength | Gloss | Transparency |
|------------|-----------------|-------|--------------|
| Example 58 | —               | 112   | 2TR          |
| Example 59 | 114             | 114   | 3TR          |

We claim:

1. A composition comprising a pigment selected from the group consisting of an azo, azo metal salt or complex, azomethine, azomethine salt or complex, phthalocyanine, anthraquinone, isoindoline, perinone, quinacridone and dipyrrolopyrrole pigment and mixtures thereof and from 0.1 to 10% by weight, based on the weight of pigment, of at least one dendrimer.

2. The composition of claim 1 in which the dendrimer is an amide or an ester.

3. The composition of claim 1 in which the dendrimer has hydroxyl, carboxyl, ester, or amine terminal groups.

4. The composition of claim 1 in which the core of the dendrimer is a diamine.

5. The composition of claim 1 in which the dendrimer is of generation 0.5 to 3.5.

6. The composition of claim 1 which also contains a resin, dyestuff and/or surfactant.

7. A process for preparing the composition of claim 1 claim which comprises adding the dendrimer and optionally a resin, dyestuff and/or surfactant, at any stage in the pigment manufacture or to the dry pigment after its preparation.

8. An ink or paint which contains, as a colourant, a composition as claimed in claim 1.

* * * * *

UNITED STATES PATENT AND TRADEMARK OFFICE
CERTIFICATE OF CORRECTION

PATENT NO. : 6,096,801
DATED : AUGUST 1, 2000
INVENTOR(S) : MARK JOHN VINCENT ET AL

It is certified that error appears in the above-indentified patent and that said Letters Patent is hereby corrected as shown below:

On the title page, the Section [30] should read:

-- [30]     Foreign Application Priority Data

Jun 6, 1997    United Kingdom  [GB]     9711625.5 --.

Signed and Sealed this

Tenth Day of April, 2001

Attest:

NICHOLAS P. GODICI

*Attesting Officer*      *Acting Director of the United States Patent and Trademark Office*